United States Patent [19]

Daire et al.

[11] Patent Number: 5,283,278
[45] Date of Patent: Feb. 1, 1994

[54] GAS PHASE OLEFIN POLYMERIZATION PROCESS

[75] Inventors: Erick Daire, Chateauneuf les Martigues; John G. Speakman, Sausset les Pins, both of France

[73] Assignee: BP Chemicals Limited, London, England

[21] Appl. No.: 681,884

[22] Filed: Apr. 8, 1991

[30] Foreign Application Priority Data

Apr. 11, 1990 [FR] France ................... 90 04916

[51] Int. Cl.$^5$ ................................................ C08K 5/09
[52] U.S. Cl. ........................................ 524/399; 524/398; 524/400; 526/901; 526/903; 526/904
[58] Field of Search .............. 524/399, 398, 400; 523/223; 526/901, 903, 904

[56] References Cited

U.S. PATENT DOCUMENTS

| | | | |
|---|---|---|---|
| 4,330,649 | 5/1982 | Kioka et al. | 526/125 |
| 4,330,650 | 5/1982 | Sakurai et al. | 526/127 |
| 4,410,671 | 10/1983 | Welch et al. | 526/119 |
| 4,594,367 | 6/1986 | Geissel et al. | 523/167 |
| 4,920,167 | 4/1990 | Ruetman et al. | 524/155 |
| 5,165,998 | 11/1992 | Bailly et al. | 428/407 |

OTHER PUBLICATIONS

I. Foygt, Stabilization of Synthetic Polymers Against the Effect of Light and Heat, Leningrad, "Khimiya" Publishers, 1972, pp. 338–339, Exhibit 2 & 3, original Russian with English translation.

*Primary Examiner*—Paul R. Michl
*Assistant Examiner*—John J. Guarriello
*Attorney, Agent, or Firm*—Brooks Haidt Haffner & Delahunty

[57] ABSTRACT

The present invention relates to an alpha-olefin prepolymer catalytically active in an alpha-olefin (co-)polymerization comprising a transition metal, an organometallic compound and an antistatic agent. The prepolymer can be prepared by contacting the antistatic agent with a catalyst comprising the transition metal and the organometallic compound before or during an alpha-olefin prepolymerization. It can also be prepared by contacting the antistatic agent with an alpha-olefin prepolymer after a prepolymerization. It can also be prepared by a combination of the two methods. The prepolymer can be introduced into a gas phase (co-)polymerization medium for preparing polyolefin directly in a dry powder form, with a reduced amount of sheeting and agglomerates.

14 Claims, No Drawings

GAS PHASE OLEFIN POLYMERIZATION PROCESS

The invention relates to a process for the gas phase polymerization of alpha-olefins which involves a prepolymerization step and the use of an alpha-olefin prepolymer. The process of the invention is particularly applicable to the gas phase polymerization of ethylene, propylene or 1-butene, or mixed with each other and/or optionally with other alpha-olefins such as 1-hexane, 1-octene or 4-methyl-1-pentene.

It is known to polymerize one or more alpha-olefins from a reaction gas mixture containing the alpha-olefin(s) to be polymerized, in a fluidized bed reactor where the polymer particles being formed are maintained in the fluidized state by means of the reaction gas mixture travelling in an upward stream. The gas mixture leaving at the top of the fluidized bed reactor is recycled to the bottom of the latter by means of a gas recycling conduit and of a compressor. During this recycling the gas mixture is most frequently cooled with the aid of a heat exchanger so as to remove the heat produced during the polymerization reaction and to keep constant the polymerization temperature in the fluidized bed.

It is known to carry out the polymerization reaction by using a prepolymer powder prepared beforehand during a prepolymerization stage, with the aid of a catalyst system of Ziegler-Natta type consisting of a solid catalyst based on a transition metal and of a cocatalyst comprising an organometallic compound. The prepolymer powder may also be prepared with the aid of a high-activity catalyst comprising a chromium oxide supported on a granular carrier based on a refractory oxide and activated by a heat treatment. However, when such a process is carried out, it is possible to observe that polymer particles can adhere to the reactor wall and form sheets of polymer. This phenomenon is particularly inopportune because of the fact that these sheets can suddenly become detached from the reactor wall, fall into the bed and thus cause the stoppage of the polymerization reactor. Furthermore, the prepolymer powder can exhibit relatively mediocre dry flow properties and can make it difficult to introduce it into the gas phase polymerization reactor. The disturbing consequences resulting from an irregular feed of catalyst or of prepolymer to a gas phase polymerization reactor are generally known, and especially the risks of formation of hot spots and of agglomerates of molten polymer in the fluidized bed.

European Patent Application EP-A-0,232,701 also discloses a process which makes it possible to manufacture ethylene polymers in a gas phase polymerization reactor with the aid of a catalyst of Ziegler-Natta type, a cocatalyst and an antistatic agent, which are introduced into the reactor separately from each other requiring simultaneous control of the feeds of these three constituents. Furthermore, the antistatic agent introduced into the reactor in the form of a solution in a paraffin-based oil is difficult to disperse in the bed and its efficiency is weakened thereby. In addition, the process may also comprise a stage of treatment of the reactor using the antistatic agent, before the introduction of the catalyst into the reactor and before the startup of the reaction. This preliminary stage correspondingly shortens the time devoted to the production of polyethylene.

An alpha-olefin (co-)polymerization process has now been found, which is carried out in a gas phase polymerization reactor and which makes it possible in particular to avoid the formation of polymer sheets without encountering the disadvantages referred to above. In particular, this process makes use of a catalyst, an organometallic compound and an antistatic agent which are introduced together into the polymerization reactor by means of a single feed. Furthermore, it employs prepolymers which have excellent dry flow properties.

The subject of the invention is therefore a process for gas phase (co-)polymerization of one or more alpha-olefins with the aid of a prepolymer containing a catalyst based on a transition metal belonging to one of the groups IV, V or VI of the Periodic Classification of the elements and an organometallic compound of a metal of group II or III of the said Periodic Classification, the prepolymer being obtained in the course of a prepolymerization carried out before the (co-)polymerization by bringing the said catalyst into contact with one or more alpha-olefins and with the said organometallic compound, which process is characterized in that the prepolymer introduced into the gas phase (co-)polymerization comprises an antistatic agent.

According to the invention it is essential that the gas phase (co-)polymerization of alpha-olefins should be carried out with the aid of a prepolymer containing simultaneously at least one antistatic agent and at least one organometallic compound. It has been found that such a prepolymer is not only highly active in the gas phase (co-)polymerization of alpha-olefins, but that it also permits the manufacture of polyolefin powders having a reduced amount of sheets and agglomerates. Thus, the present invention is based on the astonishing discovery that the catalytic activity of the prepolymer is not substantially decreased and can even be appreciably increased when the prepolymer contains an antistatic agent and an organometallic compound. Particularly, a catalytic activity increasing can be observed, when the antistatic agent comprises at least one metal salt of an organic carboxylic acid, such as a fatty carboxylic acid, e.g. of 8–30 carbon atoms, the salt having usually a molecular weight from 150 to 1200 and the metal being usually an alkali metal, alkaline earth metal, Cu, Zn, Cd, Al, Pb, Cr, Mo or Mn, or a metal salt, e.g. a Cr salt of a $C_{10}$–$C_{20}$ alkyl- or alkenyl-substituted aromatic carboxylic acid, or a Cr salt of an N-alkyl or N-alkenyl-salicylic acid, or a Cr salt of stearyl-anthranilic acid, or an alkali or alkaline earth metal salt, e.g. Na, K or Ca, of an alkylcarboxylate-substituted sulphonic acid, e.g. a Ca dialkylsulphosuccinate. The antistatic agent may interact physically with the prepolymer, or chemically or physically with the organometallic compound or catalyst.

According to the invention the antistatic agent present in the prepolymer is a composition, a product or a compound which is capable of limiting the phenomena linked with static electricity. In particular, the antistatic agent makes it possible to avoid the agglomeration of polyolefin particles with each other and to reduce the formation of polymer sheeting on the walls of the polymerization reactor. The antistatic agent can be one of the antistatic agents known to be used with polyolefins, e.g. polyethylene or polypropylene, in particular those mentioned in the periodical Kunststoffe 67 (1977), 3, pages 154 to 159, or in British Patent GB-A-1,402,802, the disclosures of which are hereby incorporated by reference. The antistatic agent can preferably be a composition or a mixture containing at least one metal salt of an organic carboxylic acid, such as a fatty carboxylic acid, e.g. of 8-30 carbon atoms, the salt usually having a molecular weight from 150 to 1200, e.g. 200 to 800 and the metal being usually an alkali metal, an alkaline earth metal, Cu, Zn, Cd, Al, Pb, Cr, Mo or Mn, preferably Na, K, Ca or Cr; particularly, the metal salt may be an alkali or alkaline earth salt, e.g. Na, K or Ca, of a $C_{12}-C_{22}$ fatty carboxylic acid. The metal salt also may be a metal salt, e.g. a Cr salt, of a $C_{10}-C_{20}$ alkyl- or alkenyl-substituted aromatic carboxylic acid, preferably with a hydroxyl or amino substituent, or a metal salt, e.g. a Cr salt of an N-alkyl- or N-alkenyl-anthranilic acid, e.g. a Cr salt of a $C_{14}-C_{18}$ alkyl-salicylic acid, or a Cr salt of stearyl-anthranilic acid. The metal salt may also be an alkali or alkaline earth metal salt, e.g. an Na, K or Ca salt, of an alkylcarboxylate-substituted sulphonic acid, preferably a di-($C_2-C_{12}$ alkylcarboxylate)-substituted aliphatic sulphonic acid, especially a di-($C_2-C_{12}$ alkyl) sulphosuccinate, e.g. an Na, K or Ca dihexyl-, or dioctyl-, or didecyl-, or di-2-ethylhexyl sulphosuccinate.

The antistatic agent may also comprise an alkylated phytic acid polyethylene imine salt or a quaternary ammonium salt of phytic acid. Also, it may comprise a polyelectrolyte such as a copolymer of (i) an ethylenically unsaturated carboxylic acid, e.g. of 2-6 carbon atoms, or an ethylenically unsaturated ester, e.g. with 3-22 carbon atoms, with (ii) an ethylenically unsaturated organic base, e.g. of 6-10 carbon atoms, e.g. a copolymer of (i) a $C_{10}-C_{24}$ alkyl methacrylate with (ii) 2-methyl-5-vinylpyridine. The antistatic agent may also comprise a salt of a sulphonic acid ester, a polyethylene glycol ester of a fatty carboxylic acid, e.g. of 12-22 carbon atoms, or a polyoxyethylene alkyl ether.

Commercial antistatic agents can advantageously be employed, such as "ASA3" (R) sold by SHELL (Holland) which is believed to be a mixture of a Cr salt of $C_{14}-C_{18}$ alkyl-salicylic acid, a Ca dialkylsulphosuccinate and a copolymer of alkylmethacrylate with 2-methyl-5-vinylpyridine in solution in xylene, or "KEROSTAT CE 4009" (R) or "KEROSTAT CE 5009" (R) described in European Patent Applications EP-A-0232701 and EP-A-0229368 and sold by BASF (Germany) which are believed to be a mixture of Cr N-oleylanthranilate, Ca salt of a Medialan acid and di-tert. butylphenol.

The quantity of antistatic agent which is present in the prepolymer can depend on the nature of the antistatic agent and on that of the prepolymer, and on the type of catalyst. An antistatically effective amount is such that the prepolymer contains from 0.01 to 10 mg, preferably from 0.02 to 5 mg and more particularly from 0.025 to 1 mg of an antistatic agent per gram of prepolymer. It has been found that a quantity which is too small has no effect against the formation of polymer sheets, while a quantity which is too great results in prepolymers of an adhesive nature which are difficult to employ in a gas phase polymerization reaction, especially in a fluidized bed.

The prepolymer additionally contains an organometallic compound of a metal of group II or III of the Periodic Classification of the elements. It is generally chosen from organoaluminium, organomagnesium or organozinc compounds. The organometallic compound may be a trialkylaluminium of general formula:

$AlR_3$ in which R denotes an alkyl radical containing from 1 to 12, e.g. 2 to 8 carbon atoms, such as triethylaluminium, triisobutylaluminium, tri-n-hexylaluminium or tri-n-octylaluminium. It may also be an alkylaluminium halide or alcoholate of general formula:

$AlX_nR_{3-n}$ in which X is a chlorine or bromine atom or an alkoxy radical containing 1 to 8, e.g. 1 to 4 carbon atoms, R is an alkyl radical containing from 1 to 12, e.g. 2 to 8 carbon atoms and n is a whole or fractional number equal to or greater than 0.05 and smaller than 3, e.g. 0.05 to 2, particularly 0.1 to 1. It may be chosen from diethylaluminium monochloride, ethylaluminium sesquichloride, diisobutylaluminium monochloride and ethoxydiethylaluminium. It may also be an alkylenealuminium, e.g. an isoprenylaluminium, or an aluminoxane. The latter may be either a linear aluminoxane corresponding to the general formula:

$(R^1)_2AlO(Al(R^1)-O)_mAl(R^1)_2$ in which $R^1$ denotes an alkyl radical, e.g. of 1 to 6 carbon atoms, such as methyl or ethyl, and m is a number ranging from 2 to 40, preferably from 10 to 20, or a cyclic aluminoxane corresponding to the general formula:

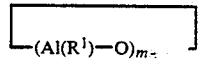

in which $R^1$ and m are as defined above. Preferably, the aluminoxane is a methylaluminoxane.

The prepolymer used in the process of the invention is prepared during a prepolymerization stage which may be carried out by batchwise or continuously. The prepolymerization consists in bringing the catalyst into contact with at least one organometallic compound and at least one alpha-olefin containing from 2 to 12 carbon atoms, in particular with ethylene, propylene or 1-butene, or mixed with each other and/or with other $C_5-C_{12}$ alpha-olefins such as 1-hexane, 4-methyl-1-pentene, 1-octene or 1-dodecene. The quantity of the organometallic compound(s) used in the prepolymerization is such that the atomic ratio of the quantity of the metal(s) of the said organometallic compound(s) to the quantity of the transition metal(s) of the catalyst is of 0.01 to 100, preferably 0.1 to 50, more particularly 0.2 to 10, e.g. 0.5 to 5. The prepolymerization may be carried out in various ways. In particular, it may be carried out in a slurry in a hydrocarbon liquid such as a liquid alpha-olefin, or an inert saturated hydrocarbon liquid such as n-pentane, isopentane, n-hexane or n-heptane. It may also be carried out in the gaseous phase in a fluidized-bed reactor and/or one fitted with a mechanical stirrer. The prepolymerization temperature is lower than that at which the prepolymer particles begin to soften. It is generally from 0° to 115° C., preferably from 25° to 100° C., e.g. 40° to 80° C. The prepolymerization may be carried out in one or more stages. It is usually stopped when the prepolymer contains from 0.1 to 500 g, preferably from 1 to 300 g, e.g. 10 to 250 g of polymer per milligram atom of transition metal. In addition, the prepolymerization may be carried out in the presence of a chain-limiting agent, such as hydrogen, in order to control the molecular weight of the prepolymer.

According to the process of the invention the antistatic agent may be brought into contact with the catalyst and the organometallic compound(s) before and/or during the prepolymerization, preferably in the beginning of the prepolymerization, and/or with the prepolymer after the prepolymerization but before the introduction of the prepolymer into the gas phase polymerization medium. The total quantity of antistatic agent to be used is from 0.1 to 200 g, preferably from 0.2 to 100 g, e.g. 0.5 to 50 g per gram atom of transition metal present in the catalyst or the prepolymer. The antistatic agent may be present in the prepolymer in a quantity of 0.05 to 200 g, preferably 0.1 to 100 g, particularly 0.2 to 50 g per gram atom of the metal(s) of the organometallic compound(s) present in the prepolymer or during the prepolymerization.

More particularly, the antistatic agent may be brought into contact with (a) a catalyst based on at least one transition metal belonging to one of the Groups IV, V or VI of the Periodic Classification of the elements and (b) at least one organometallic compound of a metal of Group II or III of the said Periodic Classification, before and/or during a prepolymerization comprising bringing the said catalyst into contact with at least one $C_2-C_{12}$ alpha-olefin and with the said organometallic compound, in quantities of from 0.1 to 200 g of the antistatic agent per gram atom of the transition metal of the said catalyst and from 0.01 to 100 moles of the said organometallic compound per gram atom of the transition metal of the said catalyst, the prepolymerization being carried out until from 0.1 to 500 g of prepolymer are obtained per milligram atom of the transition metal of the said catalyst.

In practice, the contact between the antistatic agent, the catalyst and the organometallic compound can be brought about in various possible ways. It is preferred to produce the contact in the presence of a hydrocarbon liquid, in which the antistatic agent can be in solution or in which the prepolymerization is carried out in suspension. The hydrocarbon liquid may be a liquid alpha-olefin, e.g. of 2 to 12, preferably 3 to 12 carbon atoms or preferably one or more inert unsaturated hydrocarbons, such as cycloalkanes or alkanes such as n-pentane, iso-pentane, n-hexane or n-heptane. In this way, it has been found that the antistatic agent is dispersed uniformly not only at the surface of the prepolymer particles but also inside them, surprisingly, without usually appreciably diminishing the efficiency of the antistatic agent during the gas phase (co-)polymerization.

The contact of the antistatic agent with the prepolymer after the prepolymerization can also be brought about according to various methods. The antistatic agent may be brought into contact with a prepolymer obtained after a prepolymerization comprising bringing into contact a catalyst based on at least one transition metal belonging to one of the Groups IV, V or VI of the Periodic Classification of the elements with at least one organometallic compound of a metal of Group II or III of the said Periodic Classification and with at least one $C_2-C_{12}$ alpha-olefin, the prepolymer comprising from 0.002 to 10 milligram atoms of the transition metal of the said catalyst and having an atomic ratio of the metal of the said organometallic compound to the transition metal of the said catalyst from 0.01 to 100, the antistatic agent being contacted with the prepolymer in an amount from 0.1 to 200 g per gram atom of the transition metal contained in the prepolymer. The contact of the antistatic agent with the prepolymer can be produced in particular by dry blending of the antistatic agent with the prepolymer. However, it is preferred to bring the antistatic agent into contact with the prepolymer in the presence of a hydrocarbon liquid which may be identical to that employed during the prepolymerization, e.g. a liquid alpha-olefin or an inert liquid unsaturated hydrocarbon. This presents the advantage of dispersing the antistatic agent in all the prepolymer particles, and in particular the finest particles which are generally the major source of the static electricity and can promote the formation of polymer agglomerates.

The antistatic agent contacting may be preferably carried out by a combination of the two preceding methods, i.e. by contacting the antistatic agent (i) first of all with the catalyst and the organometallic compound before or during a prepolymerization, and then (ii) with the prepolymer after the prepolymerization. More particularly, the antistatic agent may be (i) first of all brought into contact with (a) a catalyst based on at least one transition metal belonging to one of the Groups IV, V or VI of the Periodic Classification of the elements and (b) at least one organometallic compound of a metal of Group II or III of the said Periodic Classification before or during a prepolymerization, preferably at the beginning of a prepolymerization comprising bringing the said catalyst into contact with at least one $C_2-C_{12}$ alpha-olefin and with the said organometallic compound, in quantities of from 0.05 to 100 g, preferably from 0.1 to 50 g, e.g. 0.5 to 20 g of the antistatic agent per gram atom of the transition metal of the said catalyst and from 0.01 to 100 moles of the said organometallic compound per gram atom of the transistion metal of the said catalyst, the prepolymerization being carried out until from 0.1 to 500 g of prepolymer are obtained per milligram atom of the transition metal of the said catalyst, and (ii) then brought into contact with the prepolymer obtained after the end of the prepolymerization in a quantity ranging from 0.05 to 100 g, preferably from 0.1 to 50 g, e.g. 5 to 50 g of the antistatic agent per gram atom of the transition metal contained in the prepolymer. The contacting of the antistatic agent with (a) the catalyst and (b) the organometallic compound before or during the prepolymerization and the contacting of the antistatic agent with the prepolymer after the end of the prepolymerization may be carried out in the presence of a liquid hydrocarbon which is either an inert saturated hydrocarbon or an alpha-olefin. This particular process presents the advantage of dispersing the antistatic agent easily in the prepolymer and of obtaining a prepolymer containing an antistatic agent which is dispersed uniformly both inside and at the surface of the prepolymer particles.

The prepolymer thus obtained according to the invention is catalytically active in an alpha-olefin (co-)polymerization. It consists of particles with a mass-mean diameter ranging from 50 to 500 microns, preferably from 100 to 300 microns. It comprises per gram of prepolymer from 0.002 to 10, preferably from 0.003 to 0.1 milligram atoms of at least one transition metal belonging to one of groups IV, V or VI of the Periodic Classification of the elements, such as titanium, vanadium, hafnium, zirconium or chromium. It also comprises, per gram of prepolymer, at least one organometallic compound of a metal of Group II or III of the said Periodic Classification, such as aluminium, magnesium or zinc, in an atomic ratio of the metal(s) of the organometallic compound(s) to the transition metal(s) of 0.01 to 100, preferably of 0.1 to 50, e.g. 0.2 to 10 or 0.5 to 5. In addition, the antistatic agent is present in the prepolymer in an amount as specified above. The prepolymer may be used in the gas phase (co-)polymerization in the form of a dry powder which has a bulk density at rest of 0.3 to 0.55 g/cm$^3$, preferably of 0.35 to 0.52 g/cm$^3$. The prepolymer powder has excellent dry flow properties, as given by the flowability test described later, the prepolymer powder passing particularly freely under gravity through the lower orifice of a hopper whose diameter is smaller than or equal to 20 mm, preferably from 5 to 15 mm, the hopper having the shape of a conical frustum with a vertical axis and an apex angle of 30° pointing downwards.

The catalyst used during the prepolymerization stage can be a catalyst comprising a chromium oxide supported on a refractory oxide, e.g. silica, alumina, or silico-alumina, and activated by a heat treatment under a nonreductive atmosphere. This catalyst may be in particular one of those described in French Patent Applications FR-A-2,609,036 and FR-A-2,570,381.

The catalyst may also be a catalyst of Ziegler-Natta type based on at least one transition metal, preferably selected amongst titanium, vanadium, hafnium, chromium or zirconium. It may be a metallocene catalyst based on chromium or zirconium, i.e. a chromocene or zirconocene catalyst. The catalyst may contain halogen atoms, e.g. chlorine or bromine atoms. The catalyst may contain or be supported on a magnesium compound, e.g. a magnesium oxide, a magnesium hydroxide, a magnesium alkoxide, or a magnesium chloride. It may contain or be supported on a refractory oxide, e.g. silica, alumina, or silico-alumina. The catalyst may in particular correspond to the general formula $$Mg_m Me_n M(OR_1)_p (R_2)_q X_r D_s$$

in which Me is an aluminium and/or zinc atom, M is an atom of a transition metal belonging to the groups IV, V or VI of the Periodic Classification of the elements, preferably a titanium and/or vanadium atom, $R_1$ is an alkyl group containing from 1 or 2 to 14, e.g. 2 to 6 carbon atoms, $R_2$ is an alkyl group containing from 1 or 2 to 12, e.g. 2 to 6 carbon atoms, X is a chlorine and/or bromine atom, D is an electron-donor compound comprising at least one oxygen or sulphur or nitrogen or phosphorus atom, preferably free from labile hydrogen, with m from 0.5 to 50, preferably from 1 to 10,
n from 0 to 1, preferably from 0 to 0.5,
p from 0 to 3, preferably from 0 to 2,
q from 0 to 1, preferably from 0 to 0.5,
r from 2 to 104, preferably from 3 to 24, and
s from 0 to 60, preferably from 0 to 20.

The catalyst may be obtained by various processes, especially by those according to which a magnesium compound such as magnesium chloride is milled in the presence of at least one transition metal compound, or else a magnesium compound is precipitated at the same time as one or more transition metal compounds. It may also be prepared by precipitation of a transition metal compound onto solid particles consisting essentially of magnesium chloride, which can be obtained by reaction of an organomagnesium compound with an organic chlorine compound. The precipitation of the transition metal compound onto the solid particles of magnesium chloride may be carried out by reaction of reduction of a transition metal compound taken at the maximum valency with the aid of organometallic compounds of metals of groups II and III of the Periodic Classification of the elements. This reduction reaction can be carried out at a temperature of between $-30°$ C. and $+100°$ C. with agitating, e.g. stirring in a liquid hydrocarbon medium and optionally in the presence of an electron-donor compound D, preferably free from labile hydrogen, which may be chosen from a wide variety of products, such as amines, amides, phosphines, sulphoxides, sulphones, esters, thioethers, ethers, e.g. aliphatic ethers, cyclic or non-cyclic ethers.

The catalyst may in particular be prepared according to one of the processes described in French Patent Applications FR-A-2,099,311, FR-A-2,116,698 and FR-A-2,628,110.

The catalyst of Ziegler-Natta type may also include a support based on a refractory oxide such as a silica, an alumina or a mixture of these two oxides. In particular, it may be prepared according to a process which consists:

a) in a first stage, in bringing a granular support based on refractory oxide comprising hydroxyl groups into contact with a dialkylmagnesium and optionally a trialkylaluminium, b) in a second stage, in bringing the product resulting from the first stage into contact with a monochloro organic compound selected amongst primary, preferably secondary or tertiary alkyl or cycloalkyl monochlorides containing 2 to 19, preferably 3 to 19 carbon atoms and amongst compounds of general formulae $$R_6 R_7 R_8 CCl$$

in which $R_6$ is an aryl radical containing from 6 to 16, e.g. 6 to 10 carbon atoms, $R_7$ and $R_8$ being identical or different radicals chosen from hydrogen, alkyl radicals containing from 1 to 6, e.g. 1 to 4 carbon atoms and aryl radicals containing from 6 to 16, e.g. 6 to 10 carbon atoms, identical to or different from $R_6$, and (c) in a third stage, in bringing the product resulting from the second stage into contact with at least one tetravalent titanium or vanadium compound or a trivalent vanadyl compound, e.g. $TiCl_4$, $VCl_4$ or $VOCl_3$.

When the catalyst contains magnesium, chlorine, titanium and/or vanadium, and especially a support based on a refractory oxide, e.g. silica, alumina, or silico-alumina, and when, according to the invention, it is converted into a prepolymer containing an antistatic agent, unexpectedly it can exhibit a catalytic activity in gas phase (co-)polymerization of ethylene which is considerably increased. In particular, the activity of the prepolymer may be from 2 to 3 times greater than that of a prepolymer prepared in the same conditions but without antistatic agent. When a catalyst, whether of Ziegler-Natta type or chromium oxide type, is supported on a refractory oxide, one gram of prepolymer may comprise from 2 to 10,000 mg, preferably 3 to 1,000 mg, particularly 4 to 200 mg of a refractory oxide, such as silica, alumina or silico-alumina.

The prepolymer according to the present invention can be introduced into the gas phase polymerization medium either in the form of a slurry in a hydrocarbon liquid such as an inert saturated hydrocarbon or an alpha-olefin, or in the form of a dry powder. When the prepolymerization is carried out in a slurry in a hydrocarbon liquid, the prepolymer slurry can be used as such and directly introduced into the gas phase polymerization medium. The prepolymer can be also separated from the hydrocarbon liquid, preferably by evaporating off the said hydrocarbon liquid under an inert atmosphere, e.g. nitrogen, more particularly under a partial vacuum. Thus, the prepolymer is obtained in the form of a dry powder which can be used as such and directly introduced into the gas phase polymerization medium. When the prepolymerization is carried out in a gas phase, the prepolymer is obtained in the form of a dry powder which can be used as such and directly introduced into the gas phase polymerization medium. The antistatic agent which can be added to and blended with the prepolymer after the prepolymerization, but prior to the gas phase (co-)polymerization, can be contacted with the prepolymer dry powder or preferably with the prepolymer slurry. After the contacting of the antistatic agent with the prepolymer slurry, the prepolymer can be separated from the hydrocarbon liquid of the slurry, preferably by evaporating off the said hydrocarbon liquid under an inert atmosphere, and thus the prepolymer can be obtained in the form of a dry powder.

The gas phase (co-)polymerization may be carried out in a reactor fitted with a mechanical stirrer for dry powder, or, preferably, in a fluidized bed reactor in which the (co)polymer particles being formed are maintained in the fluidized state with the aid of an upward gas stream propelled at a velocity of 2 to 10 times, preferably 5 to 8 times the minimum fluidization velocity. The velocity may be between 15 and 100 cm/s, preferably between 40 and 70 cm/s. The upward gas stream consists of a reaction gas mixture which comprises in particular the alpha-olefin(s) to be (co-)polymerized and optionally a diene, a chain-limiting agent such as hydrogen and an inert gas such as nitrogen, ethane or other higher alkanes. On passing through the fluidized bed, only part of the alpha-olefin(s) is (co-)polymerized in contact with the growing (co-)polymer particles. The fraction of alpha-olefins which has not reacted leaves the fluidized bed and passes through a cooling system intended to remove the heat produced during the reaction, before being recycled to the fluidized bed reactor by means of a compressor.

The average pressure in the reactor may be close to atmospheric pressure but is preferably higher, in order to increase the polymerization rate. It may be between 0.1 and 5 MPa, preferably between 0.2 and 3 MPa.

The temperature is maintained in the reactor at a sufficient level for the (co-)polymerization to be fast without, however, being too close to the softening temperature of the polymer. It is generally of 0° to 135° C., preferably 20° to 110° C., e.g. 70° to 110° C.

In practice the prepolymer may be introduced into the reactor in the form of a dry powder or as a slurry in an inert liquid saturated hydrocarbon or in a liquid alpha-olefin. The introduction of the prepolymer may be carried out continuously or intermittently. The withdrawal of the (co-)polymer manufactured may also be carried out continuously or intermittently.

An additional organometallic compound of a metal belonging to group II or III of the Periodic Classification of the elements, in particular an organoaluminium, an organomagnesium or an organozinc compound may be introduced into the reactor during the gas phase (co-)polymerization. It may be identical to or different from that contained in the prepolymer. The additional organometallic compound may be introduced into the polymerization reactor in the liquid state or in the gaseous state, and may also be added to the prepolymer before it is introduced into the gas phase polymerization reactor. An electron-donor compound, e.g. of the above mentioned formula D, may also be used. The latter may be added to the prepolymer before it is introduced into the gas phase polymerization reactor. It may also be directly introduced into the polymerization reactor or mixed with the additional organometallic compound.

According to the process of the present invention it is possible to polymerize or copolymerize alpha-olefins containing from 2 to 12 carbon atoms, in particular ethylene, propylene or 1-butene, or mixed with each other and/or with other $C_5$-$C_{12}$ alpha-olefins such as 4-methyl-1-pentene, 1-hexene, 1-octene, 1-decene or 1-dodecene, or with dienes. The process is very particularly suitable for the gas phase polymerization or copolymerization of ethylene or propylene in a fluidized bed.

Determination of the Flowability of a Prepolymer Powder

The flowability of a prepolymer powder is determined with the aid of a series of eight hoppers which are in the shape of a conical frustum of revolution, with a vertical axis and with an apex angle of 30° pointing downwards. These hoppers differ from each other in the diameter of the small circular base, corresponding to the lower orifice of the hopper, this diameter being equal to 5, 10, 15, 20, 25, 30, 35 or 40 mm, and in the height of the conical frustum, equal to 107, 100, 90, 80, 73, 65, 58 or 52 mm respectively.

The lower orifice of the hopper is closed by means of a glass plate. The prepolymer powder which has been aerated and loosened beforehand is poured into the hopper through the upper orifice without being packed. When the hopper is filled, the powder is levelled at the height of the upper orifice of the hopper by trimming off horizontally the excess quantity of poured powder. The glass plate closing the lower orifice is then withdrawn and it is ascertained whether free flow of the powder takes place or not.

The flowability of a prepolymer powder is determined by the smallest value of the diameter of the lower orifice through which the powder is capable of flowing freely under gravity. According to this method a prepolymer powder is considered as having a good flow property when it runs freely under gravity through the lower orifice of the hopper with a diameter smaller than or equal to 20 mm.

The following nonlimiting examples illustrate the present invention.

EXAMPLE 1

Preparation of an Ethylene Prepolymer in Suspension in N-hexane

Into a stainless steel 1000-liter reactor equipped with a jacket and with a stirrer rotating at 140 revolutions per minute and maintained at 30° C. were introduced under nitrogen atmosphere, successively, 500 liters of n-hexane, 1 liter of an n-hexane solution containing 17.5 g of antistatic agent of trademark "ASA 3" sold by Shell Company (Holland), 0.6 liters of a solution containing 1 mole/liter of tri-n-octyl-aluminium in n-hexane and, lastly, a quantity of a catalyst prepared exactly as in Example 1 of French Patent Application FR-A-2,570,381 and containing 2.3 gram atoms of chromium.

The reactor was then heated to 75° C. and ethylene was introduced therein at a substantially constant rate of 15 kg/h for 8 hours. At the end of this time a suspension of prepolymer was obtained, which was maintained at the temperature of 75° C. for 30 minutes in order to consume as much unreacted ethylene as possible. The reactor was then degassed and then cooled to 60° C.

To the prepolymer suspension was added 300 liters of n-hexane preheated to 60° C., 0.3 mole of tri-n-octylaluminium and 10 g of "ASA 3". The prepolymer suspension was kept stirred for 15 minutes under these conditions. After settling for 15 minutes, approximately 300 liters of liquid were extracted from this suspension. The whole of this operation was repeated 4 times and the prepolymer suspension was then cooled to room temperature (20° C.) and 0.8 mole of tri-n-octylaluminium were added to it. After drying under nitrogen approximately 120 kg of a prepolymer were obtained, consisting of a nonadhesive powder which had very good dry flow properties and a bulk density of 0.4 g/cm$^3$. This powder consisted of particles which had a mass-mean diameter of 250 microns and contained 0.019 milligram atoms of chromium, 0.021 milligram atoms of aluminium and 0.48 mg of antistatic agent per gram of prepolymer.

Polymerization of Ethylene in a Fluidized Bed

The operation was carried out with the aid of a stainless steel fluidized reactor of 45 cm diameter, the fluidization being produced by a rising gas mixture propelled at a velocity of 52 cm/s and at a temperature of 108° C. The gas mixture consisted of hydrogen, ethylene and nitrogen, the partial pressures (pp) of these three constituents being the following:
hydrogen pp: 0.36 MPa
ethylene pp: 1.05 MPa
nitrogen pp: 0.593 MPa 70 kg of a degassed and anhydrous polyethylene powder were introduced into this reactor as a powder charge, followed by 1 liter of a molar solution of tri-n-octylaluminium in n-hexane. 4 g of the prepolymer prepared previously were then introduced into this reactor sequentially at a frequency of once every 5 minutes.

At the end of approximately 3 hours, the polyethylene output having become steady, 10 ml/h of a molar solution of tri-n-octylaluminium in n-hexane were introduced continuously into the reactor. In these conditions, approximately 28 kg/h of a polyethylene powder were collected by sequential withdrawal, and no formation of polyethylene sheets along the reactor wall was observed. After 8 hours' operation, the powder charge introduced initially into the reactor was practically completely removed and a polyethylene powder was obtained which had the following characteristics:
density: 0.953 g/cm$^3$ (at 20° C.)
chromium content: lower than 2 ppm
melt index (MI5) measured at 190° C. under a 5 kg load according to ASTM-D-1238 condition P: 1.5 g/10 minutes
bulk density: 0.40 g/cm$^3$
molecular weight distribution (Mw/Mn): 7.7.

EXAMPLE 2

Preparation of an Ethylene Prepolymer in Suspension in N-Hexane

The operation was carried out exactly as in Example 1.

Copolymerization of Ethylene with 1-Butene in a Fluidized Bed

The operation was carried out with the aid of a stainless steel fluidized bed reactor of 45 cm diameter, the fluidization being produced by a rising gas mixture propelled at a velocity of 52 cm/s at a temperature of 90° C.; the gas mixture consisted of hydrogen, ethylene, 1-butene and nitrogen, the partial pressures (pp) of these four constituents being the following:
hydrogen pp: 0.204 MPa
ethylene pp: 1.05 MPa
1-butene pp: 0.021 MPa
nitrogen pp: 0.725 MPa 70 kg of a degassed and anhydrous polyethylene powder were introduced into the reactor as a powder charge, followed by 1 liter of a molar solution of tri-n-octylaluminium in n-hexane. 3.2 g of the prepolymer prepared previously were then introduced into this reactor sequentially at a frequency of once every 5 minutes.

At the end of approximately 3 hours the output of copolymer of ethylene and 1-butene having become steady, 10 ml/h of a molar solution of tri-n-octylaluminium in n-hexane were introduced continuously into the reactor. Approximately 30 kg/h of a copolymer powder were collected under these conditions by sequential withdrawal, and no formation of copolymer sheets along the reactor wall was observed. After 8 hours' operation under these conditions the powder charge introduced initially into the reactor was practically completely removed and a powder of copolymer of ethylene and 1-butene which had the following characteristics was obtained:
density: 0.938 g/cm$^3$ (at 20° C.)
weight content of 1-butene-derived unit: 1.3%
chromium content: less than 2 ppm.

EXAMPLE 3

Preparation of a Catalyst

A granular support is employed, consisting of a silica powder sold under the trademark "SG 332" by W. R. Grace Company (USA) which had a specific surface area (BET) of 300 m$^2$/g and a pore volume of 1.7 ml/g. It consisted of particles which had a mass-mean diameter of 80 microns. It was dried for 5 hours at 200° C. under an air atmosphere and a silica powder rid of free water and containing approximately 2 millimoles of hydroxyl group per gram was obtained. All the subsequent operations were carried out under a nitrogen atmosphere.

600 ml of n-hexane and 60 g of the silica dried previously were introduced into a stainless steel 1-liter reactor fitted with a stirrer rotating at 250 revolutions per minute, followed slowly over 1 hour by 138.6 millimoles of dibutylmagnesium, at a temperature of 20° C. The mixture thus obtained was stirred for 1 hour at 20° C. and a solid product (A) was obtained.

The reactor containing the suspension of the solid product (A) in n-hexane was then heated to 50° C. 277.2 millimoles of tert-butyl chloride were introduced slowly into the reactor over 1 hour with stirring. At end of this time the mixture was stirred for one hour at 50° C., then cooled to room temperature (20° C.). A suspension of a solid product (B) in n-hexane was obtained, which contained chlorine and magnesium in an atomic ratio Cl/Mg equal to 1.69 and which contained substantially no functional group reductive towards titanium tetrachloride.

The reactor containing the suspension of the solid product (B) in n-hexane was then heated to 50° C. 69.3 millimoles of titanium tetrachloride were introduced into it slowly over 2 hours. The mixture thus obtained was kept stirred for 1 hour at 50° C. and was then cooled to room temperature. A solid catalyst (C) in suspension in n-hexane was obtained, after three washings each time with 600 ml of n-hexane, contained 2.81 milligram atoms of magnesium, 5.7 milligram atoms of chlorine and 0.65 milligram atoms of tetravalent titanium per gram of silica.

Preparation of an ethylene prepolymer in suspension in n-hexane

Into a stainless steel 1000-liter reactor equipped with a jacket and a stirrer rotating at 140 revolutions per minute and heated to 70° C. were introduced in succession 450 l of n-hexane, 1 liter of a solution containing 2.8 g of an antistatic agent of trademark "ASA 3" (R) in n-hexane, 3.6 moles of tri-n-octylaluminium and, lastly, a quantity of the catalyst prepared previously, containing 3 gram atoms of titanium. Into this reactor were then introduced a quantity of hydrogen until partial pressure of hydrogen of 0.06 MPa was obtained, and ethylene at a substantially constant rate of 15 kg/h for 8 hours. At the end of the second and the fourth hours of reaction, a quantity of hydrogen corresponding to a partial pressure of 0.04 MPa was introduced into the reactor. After 8 hours' reaction the introduction of ethylene was stopped and 67 g of "ASA 3" (R) were introduced into the reactor. A suspension of 120 kg of a prepolymer was obtained, which was kept stirring for 15 minutes. After evaporation of the n-hexane and drying under nitrogen approximately, 120 kg of a nonadhesive prepolymer powder was obtained, which had very good dry flow properties and a bulk density of 0.45 g/cm$^3$. This powder consisted of particles which had a mass-mean diameter of 240 microns and contained 0.58 mg of antistatic agent, 0.03 milligram atoms of aluminium and 0.025 milligram atoms of titanium per gram of prepolymer.

Polymerization of Ethylene in a Fluidized Bed

The operation was carried out with the aid of a stainless steel fluidized bed reactor of 45 cm diameter, the fluidization being produced by a rising gas stream propelled at a velocity of 40 cm/s at a temperature 85° C. This gas mixture consisted of hydrogen, ethylene and nitrogen, the partial pressures (pp) of these three constituents being the following:
  hydrogen pp: 0.45 MPa
  ethylene pp: 0.70 MPa
  nitrogen pp: 0.45 MPa
100 kg of a degassed and anhydrous polyethylene powder were introduced into the reactor as a powder charge, followed by 0.3 liter of a molar solution of triethylaluminium in n-hexane. Into this reactor were then introduced, sequentially, at a frequency of once every 5 minutes, 15 g of the prepolymer prepared previously and, continuously, 9 ml/hour of a molar solution of triethylaluminium in n-hexane. The polyethylene produced was recovered by sequential withdrawal in order to keep the fluidized bed at a constant height.

After 20 hours' operation under these conditions the powder charge introduced initially into the reactor was practically completely removed and a polyethylene powder which had the following characteristics was recovered at a rate of 18 kg/hour:
  density: 0.960 g/cm$^3$ (at 20° C.)
  titanium content: 12 parts by weight per million (ppm)
  silica content: 400 ppm
  melt index MI2.16 measured at 190° C. under a 2.16 kg load according to ASTM-D-1238 conddition E: 4 g/10 minutes.
  bulk density: 0.40 g/cm$^3$
  molecular weight distribution measured as the Mw/Mn ratio: 5.4.

After 12 days' operation the reaction was stopped and no sheet of polymer was found in the reactor.

EXAMPLE 4

Preparation of a Catalyst

The operation was carried out exactly as in Example 3.

Preparation of an Ethylene Prepolymer

The operation was carried out exactly as in Example 3.

Copolymerization of Ethylene with 1-Butene in a Fluidized Bed

The operation was carried out with the aid of a stainless steel fluidized bed reactor of 45 cm diameter, the fluidization being produced by rising gas mixture propelled at a velocity of 40 cm/s at a temperature of 80° C. The gas mixture consisted of hydrogen, ethylene, 1-butene and nitrogen, the partial pressures (pp) of these four constituents being the following:
  hydrogen pp: 0.42 MPa
  ethylene pp: 0.32 MPa
  1-butene pp: 0.08 MPa
  nitrogen pp: 1.16 MPa
100 kg of a degassed and anhydrous powder of a copolymer of ethylene and 1-butene were introduced into the reactor as a powder charge, followed by 0.3 l of a molar solution of triethylaluminium in n-hexane. Into this reactor were then introduced, sequentially, at a frequency of once every 6 minutes, 15 g of the prepolymer prepared previously and, continuously, 9 ml/hour of a molar solution of triethylaluminium in n-hexane. The copolymer produced was recovered by sequential withdrawl to keep the fluidized bed at a constant height.

After 15 hours' operation under these conditions the powder charge introduced initially into the reactor was practically completely removed and 20.5 kg/hour of a copolymer of ethylene and 1-butene which had the following characteristics were recovered:
  density: 0.919 g/cm$^3$ (at 20° C.)
  titanium content: 8 ppm
  silica content: 250 ppm
  melt index MI2.16 measured at 190° C. under a 2.16 load according to ASTM-D-1238 condition E: 1.1 g/10 minutes
  bulk density: 0.30 g/cm$^3$
  molecular weight distribution measured by the ratio Mw/Mn: 5.4.

After 12 days' operation the reaction was stopped and no sheet of polymer was found in the reactor.

EXAMPLE 5 (COMPARATIVE)

Preparation of a Catalyst

The operation was carried out exactly as in Example 3.

Preparation of an Ethylene Prepolymer

The operation was carried out exactly as in Example 3, apart from the fact that no antistatic agent "ASA 3" (R) was employed. The prepolymer thus obtained had a bad flow property, characterised by the fact that it ran freely under gravity through the lower orifice of the hopper with a diameter higher than or equal to 40 mm.

Copolymerization of Ethylene with 1-Butene in a Fluidized Bed

The operation was carried out exactly as in Example 4, apart from the fact that the prepolymer prepared above was employed instead of the prepolymer prepared in Example 4.

Under these conditions the copolymer output was 16 kg/h and after 2 days operation a formation of copolymer sheets was observed, which made it necessary to stop the copolymerization reaction.

EXAMPLE 6

Preparation of an Ethylene Prepolymer in Suspension in n-Hexane

Into a stainless steel 1000-liter reactor equipped with a jacket and a stirrer rotating at 140 revolutions per minute and heated to 70° C. were introduced successively 450 l of n-hexane, 1 liter of a solution containing 3 g of an antistatic agent of trademark "ASA 3" (R) in n-hexane, 3.15 moles of tri-n-octylaluminium and, finally, a quantity of the catalyst prepared exactly as in Example 1(a) of French Patent Application FR-A-2405,961 containing 3 gram atoms of titanium. Into this reactor were introduced a quantity of hydrogen to obtain a partial pressure of hydrogen of 0.01 MPa, and ethylene at a substantially constant rate of 15 kg/h. After 8 hours' reaction the introduction of ethylene was stopped.

A suspension of 120 kg of a prepolymer was obtained, which was kept stirred 15 minutes. After evaporation of the n-hexane and drying under nitrogen, approximately 120 kg of a nonadhesive prepolymer powder was obtained, which had very good dry flow properties and a bulk density of 0.35 g/cm$^3$. This powder consisted of particles which had a mass-mean diameter of 220 microns and contained 0.025 mg of antistatic agent, 0.026 milligram atoms of aluminium and 0.025 milligram atoms of titanium per gram of prepolymer.

Copolymerization of Ethylene with 1-butene in a Fluidized Bed

The operation was carried out with the aid of a stainless steel fluidized bed reactor of 45 cm diameter, the fluidization being produced by a rising gas stream propelled at a velocity of 40 cm/s at a temperature of 80° C. This gas mixture consisted of hydrogen, ethylene, 1-butene and nitrogen, the partial pressures (pp) of these four constituents being the following:

hydrogen pp: 0.10 MPa
ethylene pp: 0.56 MPa
1-butene pp: 0.21 MPa
nitrogen pp: 0.73 MPa 100 kg of a degassed and anhydrous powder of copolymer of ethylene and 1-butene were introduced into the reactor as a powder charge, followed by 1 liter of a molar solution of triethylaluminium in n-hexane. 15 g of the prepolymer prepared beforehand were then introduced into this reactor sequentially at a frequency of once every 5 minutes. The polyethylene produced was recovered by sequential withdrawal to keep the fluidized bed at a constant height.

After 20 hours' operation under these conditions the powder charge introduced initially into the reactor was practically completely removed and a copolymer powder which had the following characteristics was recovered at a rate of 20 kg/hour:

density: 0.918 g/cm$^3$ (at 20° C.)
titanium content: 18 ppm
melt index MI$_{2.16}$ measured at 190° C. under a 2.16 kg load according to ASTM-D-1238 condition E: 0.9 g/minutes
bulk density: 0.33 g/cm$^3$
molecular weight distribution measured by the ratio Mw/Mn: 4.6

After 17 days' operation the reaction was stopped and no copolymer sheet was found in the reactor.

We claim:

1. A catalyst composition for a gas phase (co-) polymerization of alpha-olefins comprising a prepolymer of one or more $C_2$–$C_{12}$ alpha-olefins consisting of particles with a mass-mean diameter ranging from 50 to 500 microns and containing: (a) at least one transition metal belonging to one of Groups IV, V or VI of the Periodic Classification of the elements in a quantity of 0.002 to 10 milligram atoms of said at least one transition metal per gram of prepolymer, (b) an antistatic agent, and (c) at least one organometallic compound of Group II or III of said Periodic Classification in an atomic ratio of the metal(s) of the organometallic compound(s) to the transition metal(s) of 0.01 to 100.

2. A catalyst composition according to claim 1, characterised in that it comprises from 0.01 to 10 mg of the antistatic agent per gram of catalyst composition.

3. A catalyst composition according to claim 1 or 2, characterised in that the antistatic agent comprises at least one of the products or compounds selected amongst:

a metal salt of a $C_8$–$C_{30}$ carboxylic acid, the metal being an alkali metal, an alkaline earth metal, Cu, Zn, Cd, Al, Pb, Cr, Mo or Mn, a Cr salt of a $C_{10}$–$C_{20}$ alkyl- or alkenyl-substituted aromatic carboxylic acid, a Cr salt of an N-alkyl or N-alkenyl-anthranilic acid, an alkali or alkaline earth metal salt of an alkylcarboxylate-substituted sulphonic acid, an alkylated phytic acid polyethylene imine salt, a quaternary ammonium salt of phytic acid, a copolymer of (i) an ethylenically unsaturated carboxylic acid or an ethylenically unsaturated ester with (ii) an ethylenically unsaturated organic base, a salt of a sulphonic acid ester, a polyethylene glycol ester of a fatty carboxylic acid, and a polyoxyethylene alkyl ether.

4. A catalyst composition according to claim 3, characterised in that it comprises from 2 to 10,000 mg of a refractory oxide per gram of catalyst composition.

5. A catalyst composition according to claim 3, characterised in that it is in the form of a powder having a bulk density of 0.3 to 0.55 g/cm$^3$.

6. Process for preparing the catalyst composition according to claim 3, characterised in that the antistatic agent is brought into contact with (a) at least one transition metal belonging to one of the Groups IV, V or VI of the Periodic Classification of the elements and (b) at least one organometallic compound of a metal of Group II or III of the said Periodic Classification, before and/or during a prepolymerization comprising bringing the said transition metal(s) into contact with at least one $C_2$–$C_{12}$ alpha-olefin and with the said organometallic compound, in quantities of from 0.1 to 200 g of the antistatic agent per gram atom of the transition metal and from 0.01 to 100 moles of the said organometallic compound per gram atom of the transition metal, the prepolymerization being carried out until from 0.1 to 500 g of prepolymer are obtained per milligram atom of the transition metal.

7. Process according to claim 6, characterised in that the antistatic agent is brought into contact with (a) the transition metal(s) and (b) the organometallic compound in the presence of a hydrocarbon liquid which is either an inert saturated hydrocarbon or an alpha-olefin.

8. Process for preparing the catalyst composition according to claim 3, characterised in that the antistatic agent is brought into contact with a catalyst composition obtained after a prepolymerization comprising bringing into contact at least one transition metal belonging to one of the Groups IV, V or VI of the Periodic Classification of the elements with at least one organometallic compound of a metal of Group II or III of the said Periodic Classification and with at least one $C_2$–$C_{12}$ alpha-olefin, the catalyst composition comprising from 0.002 to 10 milligram atoms of the transition metal per gram of catalyst composition and having an atomic ratio of the metal of the said organometallic compound to the transition metal from 0.01 to 100, the antistatic agent being contacted with the catalyst composition in an amount from 0.1 to 200 g per gram atom of the transition metal contained in the catalyst composition.

9. Process according to claim 8, characterised in that the antistatic agent is brought into contact with the catalyst composition in the presence of a hydrocarbon liquid which is either an inert saturated hydrocarbon or an alpha-olefin.

10. Process for preparing the catalyst composition according to claim 3, characterised in that the antistatic agent (i) is first of all brought into contact with (a) at least one transition metal belonging to one of the Groups IV, V or VI of the Periodic Classification of the elements and (b) at least one organometallic compound of a metal of Group II or III of the said Periodic Classification before or during a prepolymerization comprising bringing the said transition metal(s) into contact with at least one $C_2$–$C_{12}$ alpha-olefin and with the said organometallic compound, in quantities of from 0.05 to 100 g of the antistatic agent per gram atom of the transition metal and from 0.01 to 100 moles of the said organometallic compound per gram atom of the transition metal, the prepolymerization being carried out until from 0.1 to 500 g of prepolymer are obtained per milligram atom of the transition metal, and (ii) is then brought into contact with the prepolymer obtained after the end of the prepolymerization in a quantity ranging from 0.05 to 100 g of the antistatic agent per gram atom of the transition metal contained in the catalyst composition.

11. Process according to claim 10, characterised in that the contacting of the antistatic agent with (a) the transition metal(s) and (b) the organometallic compound before or during the prepolymerization and the contacting of the antistatic agent with the catalyst composition after the end of the prepolymerization are carried out in the presence of a liquid hydrocarbon which is either an inert saturated hydrocarbon or an alpha-olefin.

12. Process according to claim 6, characterised in that the transition metal(s) is either selected amongst titanium, vanadium, hafnium, zirconium and chromium and optionally a refractory oxide support, a chromium oxide supported on a refractory oxide and activated by a heat treatment under a non-reductive atmosphere.

13. Process for the gas phase (co-)polymerization of one or more alpha-olefins, characterised in that it is carried out by introducing into the gas phase (co-)polymerization medium the catalyst composition according to claim 1.

14. Process according to claim 13, characterised in that the catalyst composition is introduced into the gas phase (co-)polymerization medium in the form of a slurry in a hydrocarbon liquid which is either an inert saturated hydrocarbon or an alpha-olefin, or in the form of a dry powder.

* * * * *